United States Patent [19]

De Boodt et al.

[11] Patent Number: 4,697,961

[45] Date of Patent: Oct. 6, 1987

[54] PROCESS FOR CONSOLIDATING SOILS

[75] Inventors: Marcel F. L. P. De Boodt; Eric B. A. De Strooper; Marc R. Van Meirvenne, all of Gent, Belgium

[73] Assignee: Labofina, S.A., Brussels, Belgium

[21] Appl. No.: 826,438

[22] Filed: Feb. 5, 1986

[30] Foreign Application Priority Data

Feb. 11, 1985 [GB] United Kingdom ................. 8503479

[51] Int. Cl.$^4$ .......................... C09K 17/00; E02D 3/12
[52] U.S. Cl. ..................... 405/264; 405/263; 405/266; 106/76; 106/84; 166/293
[58] Field of Search ............... 405/263, 264, 266, 267, 405/268; 166/293, 294; 106/76, 84, DIG. 900, 74

[56] References Cited

U.S. PATENT DOCUMENTS

| | | | |
|---|---|---|---|
| 3,028,340 | 4/1962 | Gandon et al. | 405/264 |
| 3,841,102 | 10/1974 | Cinner et al. | 405/263 |
| 3,908,388 | 9/1975 | DeVries | 405/264 |
| 4,293,340 | 10/1981 | Metz | 166/294 |
| 4,338,048 | 7/1982 | Murphy et al. | 106/74 |
| 4,354,874 | 10/1982 | Vickers | 405/263 |
| 4,354,875 | 10/1982 | Powers et al. | 405/263 |
| 4,366,136 | 12/1982 | Kartschmaroff et al. | 106/74 |
| 4,470,463 | 9/1984 | Holland | 166/293 |
| 4,590,228 | 5/1986 | Soreau et al. | 166/293 |

Primary Examiner—Cornelius J. Husar
Assistant Examiner—Nancy J. Stodola
Attorney, Agent, or Firm—John K. Abokhair; M. Norwood Cheairs

[57] ABSTRACT

Soils are consolidated with formation of a top layer having compressive strength by treating soil particles with cement, alkali silicate and a dialdehyde, at ambient temperature.

10 Claims, No Drawings

PROCESS FOR CONSOLIDATING SOILS

FIELD OF THE INVENTION

The present invention relates to a method for consolidating soils with formation of a top layer having exceptionally high compressive strength.

BACKGROUND OF THE INVENTION

Many processes have been proposed for treating subdivided matter with various chemicals in order to obtain stable aggregates. Some methods are based on the use of silicates, such as for example emulsions of aqueous solutions of an alkali metal silicate in hydrocarbon liquids with addition of an aqueous solution containing a silicate precipitator (U.S. Pat. No. 3,592,267) or alcohol solutions of organic silicates (U.S. Pat. No. 4,417,623). These compositions are mainly employed for strengthening unconsolidated sand-like material in a subsurface formation near the borehole of a water, oil or gas well. The resulting cohesive masses are permeable to the flow of water, oil or gas.

Other widely used compositions are aqueous hydraulic cement compositions which may also contain resinous compounds and other additives, such as glycols. They are employed in sealing operations and in underground operations associated with wellbores for the purpose of inhibiting the passage of water.

It has also been suggested to treat soils in order to improve their compressive strength by applying on the soil a mixture of cement and alkali metal silicate and then an aqueous solution of a silicate precipitator (British Pat. Nos. 861,378 and 1,597,782). A drawback of this method is that the silicate precipitators are mainly organometallic complexes which are toxic. Moreover, these treatments impart acceptable strength to the soil only after a relatively long period of time, and the agglomerates tend to break down and disintegrate when heavy forces and pressures are applied a few hours after treatment.

A process for consolidating soils having a poor mechanical strength would be highly desirable because it could be widely used in many countries for the solidification of soils for the construction of buildings and runways. There is also a need for a process which enables one to consolidate soils with formation of a cohesive mass having exceptionally high compressive strength. It would also be a benefit to the art if a method was available for consolidating any soil without respect to the nature of the treated soil.

SUMMARY OF THE INVENTION

According to the present invention, there is provided a process for consolidating soils which process comprises intimately contacting the soil to be solidified with cement, an alkali metal silicate and an aqueous solution of a dialdehyde acting as a hardener, said dialdehyde having the formula $O=CH-(R)_n-CH=O$, wherein R is a divalent aliphatic radical having from 1 to 8 carbon atoms and n is 0 or 1.

DETAILED DESCRIPTION OF THE PREFERRED EMBODIMENTS

Preferably the soil is in a sub-divided or crumbled state before admixture with dry cement and the resulting blend is then wetted before treatment with a silicate and a dialdehyde.

The process of the present invention is employed for consolidating soils having a poor structure or degraded soils with formation of a top layer which is even and exhibits an exceptionally high compressive strength. The solidified soil is able to bear high pressure loads. This characteristic is reached within a period of time which is shorter than with the methods of the prior art. The process of the invention is particularly valuable for making roads and runways having to be rapidly opened to heavy traffic.

The methods of applying the components may be widely varied. For example, the soil may be treated by usual means with formation of soil particles to a depth of about 25 to 35 cm, such treatment improving the contact with the cement, the silicate and the dialdehyde. Another method involves spreading the cement on the soil, crumbling to a depth of about 25 to 35 cm and then treating the blend of soil particles and cement with the silicate and the dialdehyde. In still another embodiment, the soil is removed from the area to be treated and is then intermixed with the cement, the silicate and the dialdehyde, the resulting composite then being laid over the area from which the soil has been removed.

It is clear that these treatments require the presence of water, which may be water already present in the soil or added water. For example, the mixture of soil and cement may be wetted and then sprayed with aqueous solutions of silicate and dialdehyde in one or more applications. In a further alternative an aqueous slurry of cement, silicate and dialdehyde may be used.

The cement may be any portland cement or hydraulic cement as well as a blended cement containing portland cement and granulated blast-furnace slag, pozzolan, fly-ash, etc. Generally, these blended cements hydrate and harden more slowly than portland cement, but they prevent deleterious alkali-aggregate reactions.

Comparative tests have shown that valuable results with respect to the hardness of the consolidated soil can be obtained when the amount of cement is as low as 5 parts by weight, based on 100 parts of the dry weight of treated soil. Amounts of cement higher than 15 parts by weight are not advantageous. More generally, the amount of cement will be within the range of 6 to 12 parts by weight per 100 parts by weight of dry treated soil particles.

The second component is an alkali metal silicate, more particularly sodium metasilicate which may be hydrated. The amount of sodium metasilicate, on an anhydrous basis, is generally from 1.5 to 5 parts per 100 parts by weight of dry treated soil particles. Preferably, from 2 to 3 parts of the silicate are employed.

A dialdehyde having the general formula $O=CH-(R)_n-CH=O$, wherein R is a divalent aliphatic radical having from 1 to 8 carbon atoms and n is 0 or 1 and which is water-soluble, is employed as hardener. The choice of the dialdehyde depends on its price and availability. Aliphatic dialdehydes, such as malonic, succinic, glutaric dialdehydes and more particularly glyoxal $O=CH-CH=O$ are preferred. The dialdehyde is employed in an amount which is in the range of 0.1 to 5 parts by weight per 100 parts by weight of dry treated soil particles.

The concentrations of the aqueous solutions or slurries of the compounds used in the process of the invention depend on many factors, such as the water content of the treated soils, and the mode of application of the process. Concentrated solutions of silicate could be too viscous and difficult to spread on the soil. On the other hand, too large an amount of water must be avoided, because the treated soil must rapidly dry at ambient temperature before availability for heavy traffic. For this reason, the total amount of water (water content of the soil to be treated+process water) is generally within the range of 15 to 20% by weight, based on the weight of dry treated soil.

When the soil to be treated has a high water content or the process of this invention is applied when it is raining, it is advisable to use polyacrylamide as a further component to improve the impermeability of the top layer of treated soil. The term "polyacrylamide" is to be understood to cover not only homopolymers of acrylyamide, but also copolymers of acrylamide with a lower amount of another monomer, such as (meth)acrylic acids and their esters, acrylonitrile and other vinyl monomers. Generally, the polyacrylamide has a molecular weight in the range of 50,000 to 1,500,000. The amount of polyacrylamide—if used—is from 0.5 to 5 parts by weight and is particularly from 1 to 3 parts by weight per 100 parts of dry soil articles.

The process of the present invention is flexible and allows the treatment of a wide variety of soils. By this process, one is able to consolidate soils in a rapid and efficient manner, with formation of a cohesive and compact mass exhibiting improved resistance to external high pressures.

By use of the process of the present invention, soil can be consolidated to form a load-bearing surface having enhanced load-bearing properties and decreased permeability to water. Furthermore, the soil can be consolidated within a short period of time. The present process is particularly useful for military purposes, and is highly effective for consolidating soils having a poor structure or for repairing degraded roads or airplane runways, with formation within a short period of time of a cohesive top layer exhibiting a high compressive strength and being able to bear high pressure loads, such as heavy trucks, tanks or airplanes.

Variations and modifications are practical within the scope of the disclosure without departing from the principles of the present invention. For example, further components or materials like metal lattices or perforated sheets, mineral or organic fibers, and bitumen may be incorporated in order to improve the elasticity of the consolidated soils.

The present invention is illustrated in more detail by the following examples.

The testing procedure to determine the hardness of a soil is as follows:

A specimen of the soil (before or after treatment) is introduced into a cylindrical container and is then tamped (applied energy: 5.4 kg.cm/cm$_3$). The cake is dried at 20° C. and the hardness is determined with a penetrometer provided with a microcone (area=7.8 mm$^2$) having to penetrate into the cake at a depth of 15 mm at a constant rate of 15 mm/minute. The required pressure is a measure of the cake hardness.

In the following examples, the amounts of components are expressed in parts by weight per 100 parts of dry soil.

EXAMPLE 1

A soil on which ordinary cement has been spread was treated to a depth of 25 cm so as to give a particulate blend of soil and cement. This blend was then wetted. Thereafter, an aqueous solution of sodium silicate and an aqueous solution of glyoxal were poured on the mixture, at a temperature of about 15° C.

Different tests were carried out, with respectively 2, 6, 8 and 10 parts of cement. The respective amounts of silicate (2 parts), glyoxal (0.2 part) and total water (15 parts) were the same in each test.

The hardness (or required penetration pressure expressed in MPa) of cakes dried for different periods of time is given in the following Table 1.

TABLE 1

| Amount of Cement (parts) | Drying Time (hours) | Penetration Pressure (MPa) |
|---|---|---|
| 2 | 17 | 8 |
| 6 | 17 | 13.4 |
|   | 23 | 14.3 |
|   | 60 | 22.5 |
|   | 94 | 29.5 |
| 8 | 17 | 19.5 |
|   | 23 | 22.7 |
|   | 60 | 33.8 |
|   | 94 | 44.0 |
| 10 | 17 | 14.5 |
|   | 23 | 27.5 |
|   | 60 | 37.7 |
|   | 94 | 45.5 |
|   | 120 | 52.0 |

EXAMPLE 2

The procedure of Example 1 for treating a soil was repeated by using 10 parts cement, 2 parts sodium silicate, 0.2 part glyoxal and 15 parts water.

Two comparative experiments were carried out with respectively an ordinary hydraulic cement and a fast hardening cement.

The effect of the type of cement, expressed as the ratio of the hardness of the treated soil to the hardness of the untreated soil, is given in Table 2.

TABLE 2

| Cement | Drying Time (hours) | Ratio of Hardness |
|---|---|---|
| Ordinary cement | 1 | 11 |
|  | 13 | 30.5 |
| Fast hardening cement | 1 | 22.5 |
|  | 13 | 41 |

EXAMPLE 3

The procedure of Example 1 for treating a soil was repeated by using 10 parts ordinary cement, 2 parts sodium silicate, 0.2 part glyoxal and 20 parts water.

The hardness of a cake of treated soil was determined as hereinabove described, but by using a cake which was dried for 17 hours and then wetted for 45 minutes.

The penetration pressure was 15.9 MPa.

A comparative experiment was carried out, with the exception that cement was not used. The penetration pressure was 5 MPa.

EXAMPLE 4

The procedure of Example 1 was repeated for consolidating a soil by using 10 parts ordinary cement, 2 parts sodium silicate, 0.1 part glyoxal, 1 part polyacrylamide (mean molecular weight: 75,000) and 15 parts water.

The penetration pressure of the cake (drying time:17 hrs) was 11 MPa.

EXAMPLE 5

The procedure of Example 4 was repeated, but with the exception that glytyraldehyde (0.2 part) was used instead of glyoxal.

The penetration pressure was 10.4 MPa.

EXAMPLE 6

Soil particles were mixed with different compositions and samples of the treated soils were dried for 13 hours.

In these experiments, the particles were treated respectively with:
(a) 20 parts water;
(b) 20 parts water and 10 parts ordinary cement;
(c) 20 parts water, 10 parts ordinary cement and 2 parts sodium silicate;
(d) 20 parts water, 10 parts ordinary cement, 2 parts sodium silicate and 0.2 part glyoxal.

The ratio of the hardness of the soils which were treated with compositions B, C and D to the control soil treated with water is as follows:
composition B: 13
composition C: 25
composition D: 31.

EXAMPLE 7

A composition A (composition according to the present invention) was prepared by mixing 100 parts by weight of sand, 4.8 parts of ordinary cement, 15 parts of an aqueous solution of sodium silicate at 36° Be, 3.6 parts of an aqueous solution of glyoxal (40% active material) and 38 parts of water.

By way of comparison, a composition B was prepared by mixing 100 parts of sand, 4.8 parts of ordinary cement, 15 parts of an aqueous solution of sodium silicate at 36° Be, 8 parts of an aqueous solution of imidosulfonic acid (15% active material) and 34 parts of water.

The respective amounts of water in the aqueous solution of glyoxal, on one hand, and imidosulfonic acid on the other hand, are not the same. For this reason, the amounts of added water in compositions A and B are different, in order to have the same amount of total water in each composition. This parameter is very important as regards the setting of the cement.

The ratio of the hardness of the compositions were as follows:

| Drying Time (hours) | Hardness of Composition A / Hardness of Composition B |
|---|---|
| 2 | 12.0 |
| 6 | 12.2 |
| 17 | 7.6 |
| 24 | 7.0 |
| 48 | 7.3 |

It will be apparent therefore that a dialdehyde is a more efficient hardener for the mixtures of soil, cement and alkali metal silicate.

This result could be explained by the fact that the viscosity increase of a mixture of silicate, cement, dialdehyde and water is slower and the viscosity maximum is lower during the setting period, by comparison with a similar composition wherein another hardener has been substituted for the dialdehyde.

By applying the process of the present invention, the soil particles are more easily blended with the additives and the impregnation of these particles is improved. The resulting blend is more homogeneous than with other known methods and, after the setting and drying period, it forms a cohesive mass exhibiting an exceptionally high compressive strength.

What is claimed is:

1. A process for consolidating soils which process comprises intimately contacting the soil to be solidified with:
   (a) a cement in an amount of from about 5 to about 15 parts by weight per 100 parts by weight of dry soil;
   (b) an alkali metal silicate in an amount, on anhydrous basis, of from about 1.5 to about 5 parts by weight per 100 parts by weight of dry soil;
   (c) a dialdehyde having the general formula $O=CH-(R)_n-CH=O$, wherein R is a divalent aliphatic radical having 1 to 8 carbon atoms and n is 0 or 1, in an amount, on anhydrous basis, of 0.1 to 5 parts by weight per 100 parts by weight of dry soil.

2. The process of claim 1 wherein the amount of cement is from 6 to 12 parts by weight.

3. The process of claim 1 wherein the alkali metal silicate is sodium metasilicate.

4. The process of claim 1 wherein the alkali metal silicate is present in an amount of from 2 to 3 parts by weight.

5. The process of claim 1 wherein the dialdehyde is glyoxal.

6. The process of claim 1 wherein the soil is further treated with polyacrylamide in an amount of from about 0.5 to about 5 parts by weight per 100 parts by weight of dry soil.

7. The process of claim 6 wherein the amount of polyacrylamide is from about 1 to about 3 parts by weight.

8. A process for consolidating soils which process comprises intimately contacting the soil to be solidified with:
   (a) 5 to 15 parts by weight of cement;
   (b) 1.5 to 5 parts by weight of sodium metasilicate, on anhydrous basis;
   (c) 0.1 to 5 parts by weight on anhydrous basis, of a dialdehyde having the general formula $O=CH-(R)_n-CH=O$, wherein R is a divalent aliphatic radical having from 1 to 8 carbon atoms and n is 0 or 1; and
   (d) 15 to 20 parts by weight of water; wherein the parts by weight are based on 100 parts by weight of dry soil.

9. The process of claim 8 wherein the dialdehyde is glyoxal.

10. The process of claim 8 wherein the soil is further treated with polyacrylamide in an amount of from 0.5 to 5 parts by weight.

* * * * *